(12) United States Patent
Brannon

(10) Patent No.: US 6,521,862 B1
(45) Date of Patent: Feb. 18, 2003

(54) APPARATUS AND METHOD FOR IMPROVING CHAMFER QUALITY OF DISK EDGE SURFACES WITH LASER TREATMENT

(75) Inventor: James Hammond Brannon, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/973,324

(22) Filed: Oct. 9, 2001

(51) Int. Cl.$^7$ .............................................. B23K 26/00
(52) U.S. Cl. ................................................. 219/121.66
(58) Field of Search ........................ 219/121.6, 121.65, 219/121.66, 121.67, 121.72, 121.85

(56) References Cited

U.S. PATENT DOCUMENTS

| | | |
|---|---|---|
| 4,542,037 A | 9/1985 | Delfino |
| 4,682,003 A | 7/1987 | Minakawa et al. |
| 5,226,101 A | 7/1993 | Szentesi et al. |
| 5,582,897 A | * 12/1996 | Kaneko et al. |
| 5,772,720 A | 6/1998 | Taira-Griffin et al. |

FOREIGN PATENT DOCUMENTS

| | | |
|---|---|---|
| JP | 2048423 A | 2/1990 |
| JP | 9225665 A | 2/1997 |
| JP | 2000-117471 | 4/2000 |

* cited by examiner

Primary Examiner—Samuel M. Heinrich
(74) Attorney, Agent, or Firm—Bracewell & Patterson, L.L.P.

(57) ABSTRACT

A carbon dioxide laser is used as a non-mechanical means for smoothing and polishing the as-cut chamfer surface at the edge of the disk. Applying laser radiation to the glass surface causes transient melting and resolidification. Due to surface tension effects, the glass resolidifies to produce a surface that is significantly smoother than it was before irradiation. If scratches or abrasive marks are present on the glass surface prior to irradiation, the irradiation process "polishes out" these defects as long as they are not too deep. At a wavelength near 10 $\mu$m, the penetration depth of the radiation into the glass is approximately 1 $\mu$m. Therefore, scratches and defects of this order of magnitude are eliminated. The quality of the resulting modified chamfer surface is far superior to the original mechanically ground and polished surface.

10 Claims, 2 Drawing Sheets

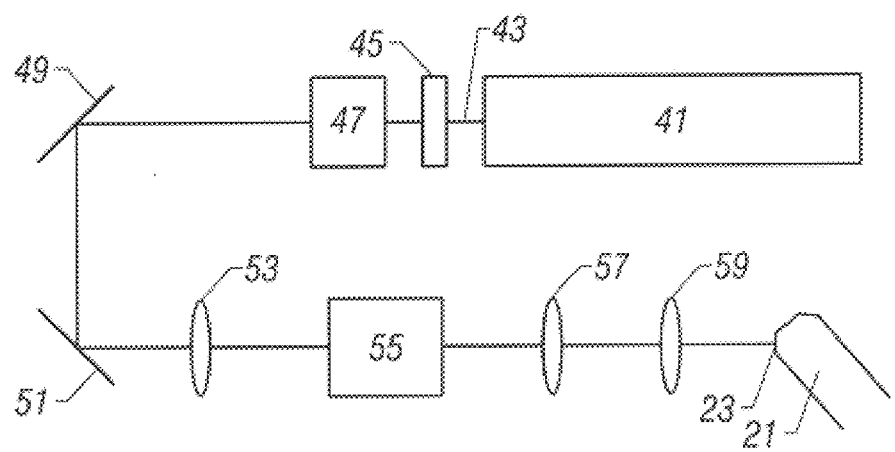
FIG. 3
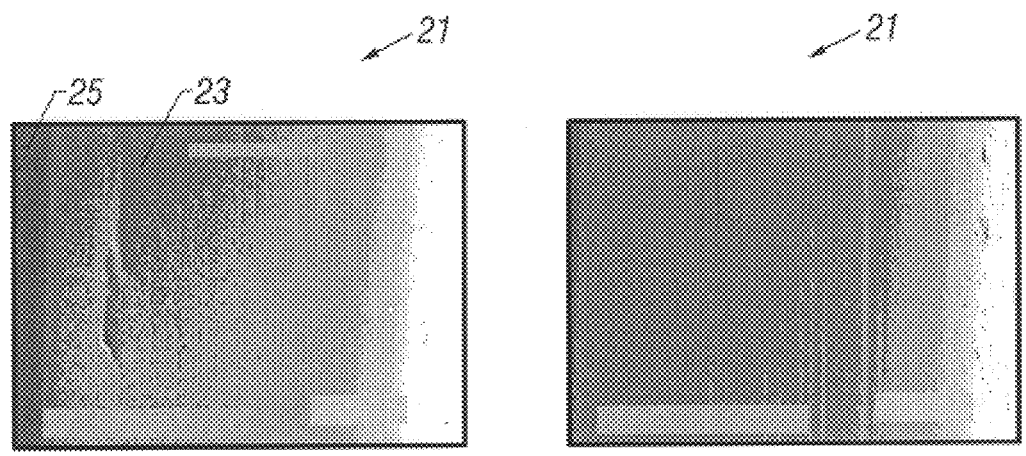
FIG. 4   FIG. 5
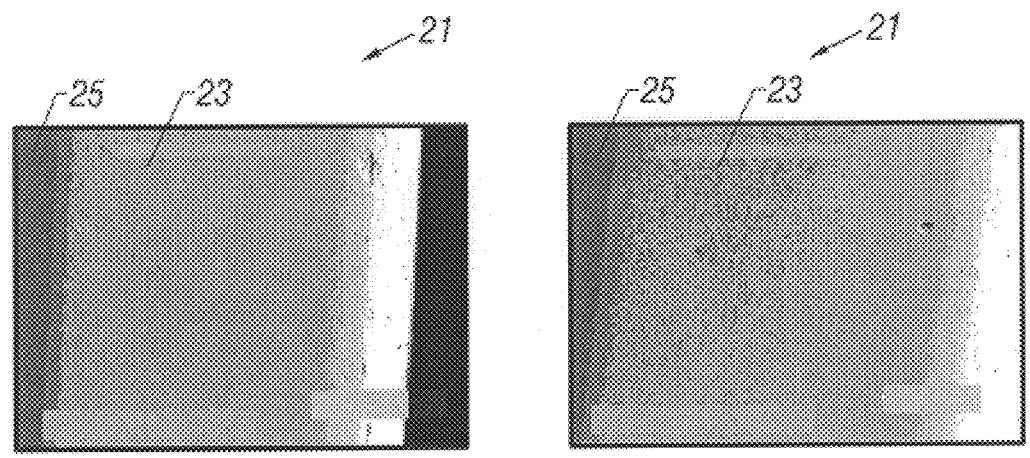
FIG. 6   FIG. 7

APPARATUS AND METHOD FOR IMPROVING CHAMFER QUALITY OF DISK EDGE SURFACES WITH LASER TREATMENT

BACKGROUND OF THE INVENTION

1. Technical Field

The present invention relates in general to the quality of disks in a hard disk drive, and in particular to an improving the chamfer quality of the edge surfaces of data storage disks in hard disk drives.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, two or three disks are stacked vertically on a common spindle that is turned by a disk drive motor at several thousand revolutions per minute (rpm).

The only other moving part within a typical HDD is the actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions (air bearing design) on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop directly over the desired track.

The outer radial edges of hard disks used for magnetic storage of data have historically caused contamination problems. The sharp corner defining the boundary between the data storage surface of the disk and the disk edge is subject to chipping and cracking with subsequent release of the particles onto the disk surface. Additionally, the edge corner can cut into the plastic holding cassette, again releasing contaminants and debris that may find their way onto the data storage surface of the disk.

For these reasons, a common approach has been to chamfer or bevel the edge corners of a disk in an attempt to mitigate this problem. While helpful, the chamfering process, particularly on glass substrates, often leaves the resulting surface with defects and scribe marks. Thus, the chamfer surface may act as a source of debris. Indeed, microscopic analysis of chamfer surfaces reveal mechanical marks, chips, and abrasions that generate additional contamination. Thus, an improved apparatus and method for fabricating hard disks is needed.

SUMMARY OF THE INVENTION

One embodiment of the present invention is an apparatus and method that uses a non-contact, non-mechanical means for smoothing and polishing the as-cut chamfer surface at the edge of the disk. Since glass disk substrates strongly absorb infrared radiation, a carbon dioxide ($CO_2$) laser provides high quality polishing and smoothing action for the mechanically cut chamfer surfaces of glass disk substrates. The silicon-oxygen bond that is abundantly available in silicate glasses of the type used for storage disks, such as magnetic data storage disks, strongly absorbs $CO_2$ laser radiation in the 9 to 11 $\mu m$ wavelength regime.

Applying laser radiation to the glass surface at the correct power density for an appropriate duration causes transient melting and resolidification. Due to surface tension effects, the glass resolidifies to produce a surface that is significantly smoother than it was before irradiation. If scratches or abrasive marks are present on the glass surface prior to irradiation, the irradiation process "polishes out" these defects as long as they are not too deep. At a wavelength of 10 $\mu m$, the penetration depth of the radiation into the glass is approximately 1 $\mu m$. Therefore, scratches and defects of this order of magnitude are eliminated. The quality of the resulting modified chamfer surface is far superior to the original mechanically ground and polished surface.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 3 is a more detailed diagram of the process and apparatus of FIG. 2.

FIG. 4 is an enlarged rendering of the surface of a disk edge prior to undergoing the process of the present invention.

FIG. 5 is an enlarged rendering of the surface of another disk edge prior to undergoing the process of the present invention.

FIG. 6 is an enlarged rendering of the surface of the disk edge of FIG. 4 after undergoing the process of the present invention.

FIG. 7 is an enlarged rendering of the surface of the disk edge of FIG. 5 after undergoing the process of the present invention.

DETAILED DESCRIPTION OF THE PREFERRED EMBODIMENT OF THE PRESENT INVENTION

Figure 1:
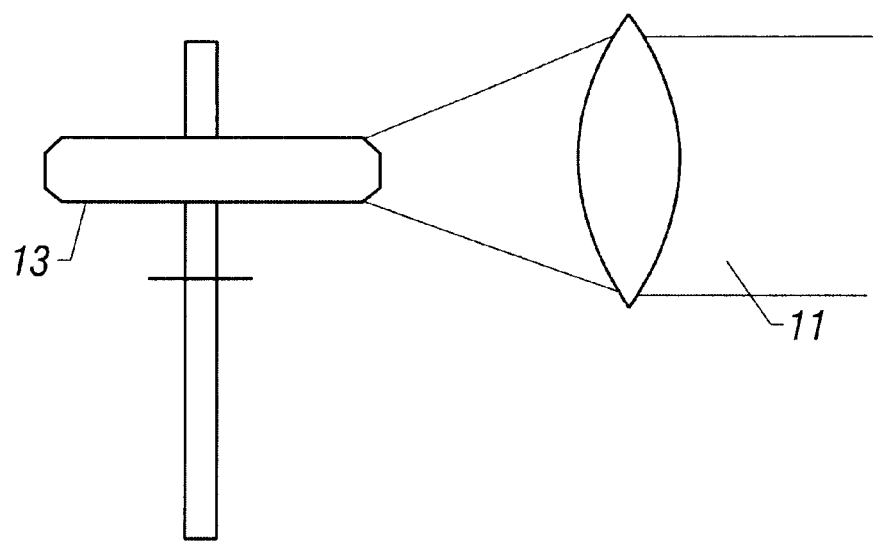
FIG. 1 is a schematic diagram of a process and apparatus for improving the quality of disk edge surfaces and is constructed in accordance with the present invention.

Referring to FIG. 1, a schematic diagram of an apparatus and process according to the present invention is shown. In one embodiment, a continuous-wave, carbon dioxide (CO2) laser 11 that emits radiation at a wavelength of 9.25 $\mu$m may be employed. This wavelength was selected because it resides near the peak of the absorption spectrum of the glass disk 13. In addition, this wavelength provides one of the shortest penetration depths available, thereby allowing for a greater surface smoothing effect. In contrast, typical CO2 lasers emit radiation at a wavelength of 10.6 $\mu$m. In this longer spectral region, the rate of glass absorption is significantly w decreased by a factor of about one-half. Consequently, the use of a 10.6 $\mu$m laser would reduce the surface specificity due to the deeper penetration depth, and results in poorer surface polishing and smoothing.

Figure 2:
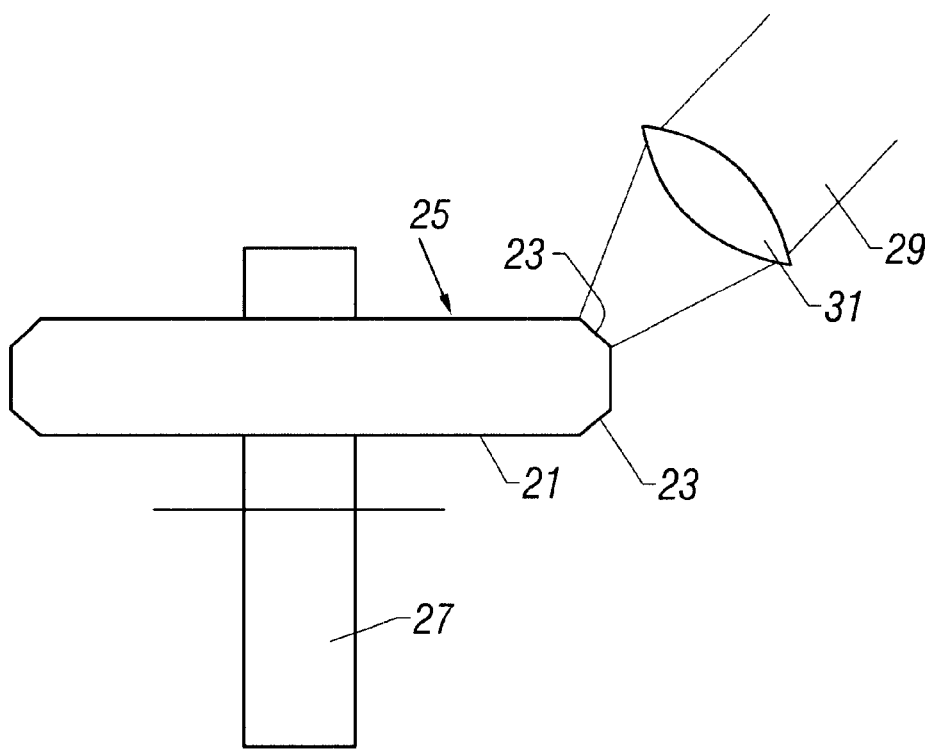
FIG. 2 is a schematic diagram of an alternate embodiment of the process and apparatus of FIG. 1.

In one set of experiments and as shown in FIG. 2, a commercial glass disk substrate 21 was used. These glass substrates have mechanically ground and polished chamfers 23 that are cut at a 45-degree angle relative to the surface 25 of the disk 21. While rotating the disk about its axis on an appropriate mechanism 27 at ten revolutions per second, CO2 radiation 29 at a power of approximately 250 $\mu$m was focused through a lens 31 onto the chamfer surface 23 (FIG. 2) for an exposure time of one second. The disk 21 is otherwise exposed to ambient operating conditions, such as ambient temperature, pressure, and humidity. The laser beam spot size was approximately 30 to 40 $\mu$m. Since the chamfer surface is about 200 $\mu$m wide, approximately six passes must be made to treat the entire surface area of the chamfer. Alternatively, a laser beam with a wider profile (FIG. 1) may be used to make fewer passes or a single pass to accomplish the same objective.

A more detailed schematic drawing of the present invention is shown in FIG. 3. In this version, a commercial CO2 laser 41, having a 9.25 micron wavelength at 10 watts, projects a beam 43 through a shutter 45 and attenuator 47. Beam 43 is reflected from mirrors 49, 51 through a collimation lens 53 and a beam expander 55. The beam 43 then passes through a series of beam conditioning lenses 57, 59 before striking chamfer 23 on disk 21.

FIGS. 4 and 5 illustrate two distinct regions or a non-irradiated chamfer surface on a disk substrate. FIG. 4 shows three abrasion marks or cuts. FIG. 5 shows clear indications of scribe marks left over from the mechanical polishing process. FIGS. 6 and 7 are two separate regions on the other chamfer surface of the same disk after irradiation. These figures show the result of irradiation which is a smooth surface profile that is distinctly unlike the surface features found on the non-irradiated chamfer in FIGS. 4 and 5. Prolonged and detailed searching of the irradiated chamfer surface (entire 360 degrees around the circumference of the disk) did not reveal any of the abrasion and scribe features shown in FIGS. 4 and 5 for the non-irradiated chamfer. The entire chamfer surface was smooth in the irradiated portion. The darker region on the left side of FIGS. 4, 6, and 7 represents the edge interface between the data surface and the chamfer surface.

The present invention has several advantages since it does use direct contact or mechanical means to smooth and polish the as-cut chamfer surface at the edge of the disk. The present invention takes advantage of the fact that glass disk substrates strongly absorb the infrared radiation of CO2 lasers. The end result is a high quality polish for the mechanically cut chamfer surfaces of the glass disk substrate. The glass melts and then resolidifies to produce a surface that is significantly smoother than it was before irradiation. Any scratches or abrasive marks (on the order of about 1 $\mu$m in depth) present on the glass surface prior to irradiation are polished out after processing. The quality of the resulting modified chamfer surface is far superior to the original mechanically ground and polished surface.

The present invention also has significant advantages over the prior art. For example, in U.S. Pat. No. 4,682,003, a method for cutting glass is disclosed whereby a laser is used. This patent specifically states that the glass piece to be worked must be heated to a temperature that is just below the softening point (about 500 degrees C.) prior to cutting via laser radiation. In contrast, disks modified with the present invention are at or near ambient operating conditions. Clearly, this technique cannot be applied to the present invention since the data storage media would have many of its precise mechanical properties (such as flatness, smoothness, waviness, etc.) strongly compromised. Moreover, the "fire polishing" step discussed in the patent relates to obtaining a desired final shape and is silent about the nature of the heated surface after treatment.

Another prior art reference, U.S. Pat. No. 4,542,037, also falls short of the present invention. Although this reference discloses a laser for edge rounding purposes, the glass being treated must have a very high absorption coefficient (30,000 per cm). In contrast, the type of glass used in hard disks has an absorption strength that is much less (approximately 5,000 to 10,000 per cm) than that required in the patent, an is thus incompatible with the patent. In addition, this patent is also silent on the microscopic nature of the treated surface.

While the invention has been shown or described in only some of its forms, it should be apparent to those skilled in the art that it is not so limited, but is susceptible to various changes without departing from the scope of the invention.

What is claimed is:

1. A method of treating a data storage disk, comprising the steps of:
    (a) providing a data storage disk having a data storage surface, a circumferential edge, and a chamfer therebetween;
    (b) rotating the disk; and then
    (c) irradiating the chamfer on the disk such that a surface of the chamfer absorbs the radiation and is polished.

2. The method of claim 1 wherein step (c) comprises focusing a laser beam on the chamfer.

3. A method of treating a data storage disk, comprising the steps of:
    (a) providing a data storage disk having a data storage surface, and a circumferential edge;

(b) mechanically grinding a chamfer on the data storage disk between the data storage surface of the circumferential edge;

(c) rotating the disk; and then (d) irradiating the chamfer on the disk with a laser such that a surface of the chamfer absorbs the radiation, melts, resolidifies, and is thereby polished.

4. The method of claim 3 wherein step (d) comprises removing any defects in the surface of the chamfer of up to approximately 1 µm in depth.

5. The method of claim 3 wherein step (c) comprises rotating the disk at approximately 10 revolutions per second.

6. The method of claim 1 wherein step (d) comprises exposing the chamfer to the laser for approximately one second.

7. A method of treating a data storage disk, comprising the steps of:

(a) providing a data storage disk having a data storage surface, and a circumferential edge;

(b) mechanically grinding a chamfer on the data storage disk between the data storage surface of the circumferential edge;

(c) rotating the disk;

(d) projecting a laser beam through a shutter and attenuator;

(e) reflecting the laser beam with a mirror into a collimation lens;

(f) expanding and focusing the laser beam with a series of beam conditioning lenses; and then (g) irradiating the chamfer on the disk with the laser beam such that a surface of the chamfer absorbs the radiation, melts, resolidifies, and is thereby polished.

8. The method of claim 7 wherein step (g) comprises removing any defects in the surface of the chamfer of up to approximately 1 µm in depth.

9. The method of claim 7 wherein step (c) comprises rotating the disk at approximately 10 revolutions per second.

10. The method of claim 7 wherein step (g) comprises exposing the chamfer to the laser for approximately one second.

* * * * *